United States Patent [19]

Walton

[11] Patent Number: 5,159,332
[45] Date of Patent: Oct. 27, 1992

[54] PROXIMITY IDENTIFICATION SYSTEM WITH FLUX CONCENTRATION IN OPERATING REGION

[76] Inventor: Charles A. Walton, 19115 Overlook Rd., Los Gatos, Calif. 95030

[21] Appl. No.: 670,359

[22] Filed: Mar. 14, 1991

Related U.S. Application Data

[63] Continuation of Ser. No. 361,560, Jun. 5, 1989, abandoned.

[51] Int. Cl.⁵ .............................................. H04Q 7/00
[52] U.S. Cl. ........................... 340/825.54; 340/825.64; 343/788
[58] Field of Search ............... 340/825.54, 825.34, 340/825.63, 825.64, 825.65, 825.69, 825.72, 825.3, 572, 573, 905, 933, 941; 455/41, 129; 343/787, 788

[56] References Cited

U.S. PATENT DOCUMENTS

| | | | |
|---|---|---|---|
| 3,495,264 | 2/1970 | Spears | 343/788 |
| 3,541,995 | 11/1970 | Fathauer | 340/825.54 |
| 3,557,758 | 1/1971 | Lack | 340/825.54 |
| 3,721,989 | 3/1973 | Christensen | 343/788 |
| 4,232,297 | 11/1980 | Gerlach et al. | 340/825.65 |
| 4,251,812 | 2/1971 | Okada et al. | 340/825.64 |
| 4,290,070 | 9/1981 | Tanaka et al. | 343/788 |
| 4,333,072 | 6/1982 | Beigel | 340/825.54 |
| 4,384,288 | 5/1983 | Walton | 340/825.64 |
| 4,550,444 | 10/1985 | Uebel | 340/825.54 |
| 4,920,340 | 4/1990 | Mizuno | 340/941 |

FOREIGN PATENT DOCUMENTS

| | | | |
|---|---|---|---|
| 2155461 | 5/1973 | Fed. Rep. of Germany | 343/788 |
| 1239303 | 7/1971 | United Kingdom | 343/788 |

OTHER PUBLICATIONS

Lay, "Recent Developments in Reduced Size VLF/LF Communications Antennas", National Telecommunications Conf. vol. III, p. 20D-1 to 5, Nov. 1973.

Primary Examiner—Donald J. Yusko
Assistant Examiner—Edwin C. Holloway, III
Attorney, Agent, or Firm—Thomas E. Schatzel

[57] ABSTRACT

A proximity identification system incorporating ferrite rods. The rods are used in both the reader and the tag and additional rods may be used to strengthen and concentrate the flux field in the regions near the reader to obtain better performance in such regions. A coding system requiring minimum power for the tag is also described.

2 Claims, 2 Drawing Sheets

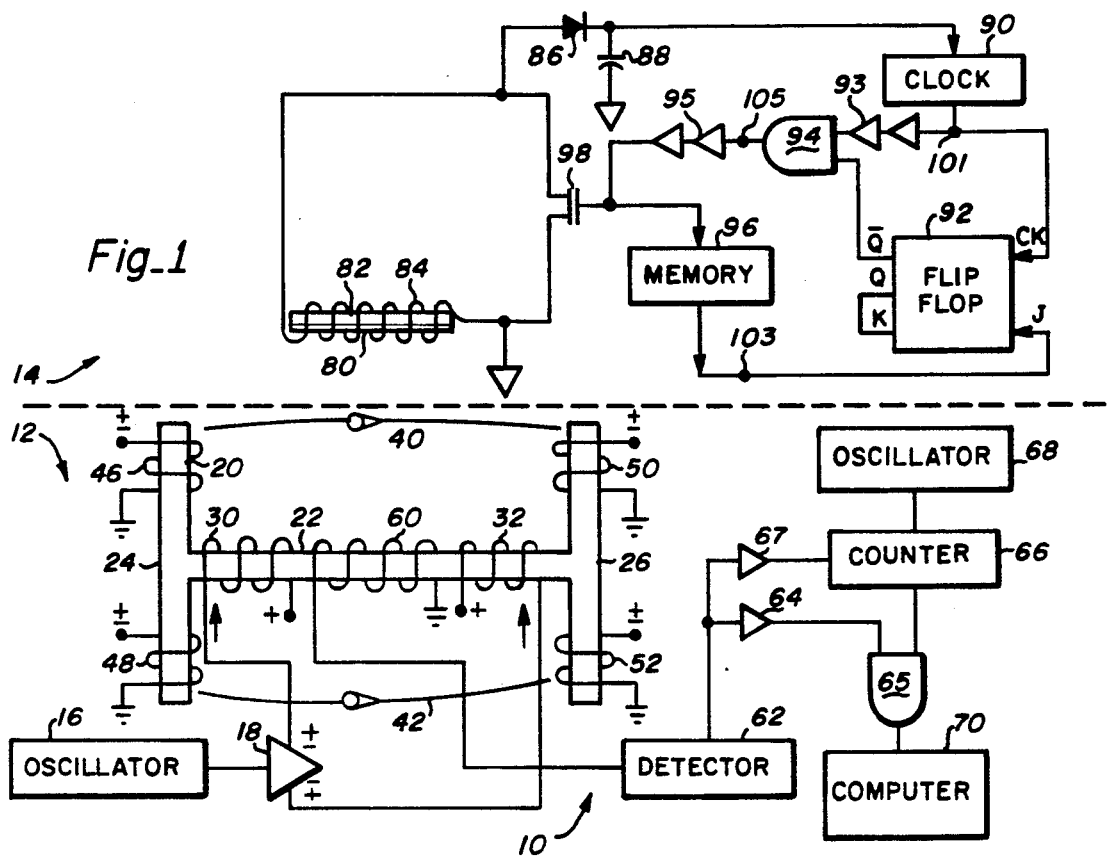
Fig_1
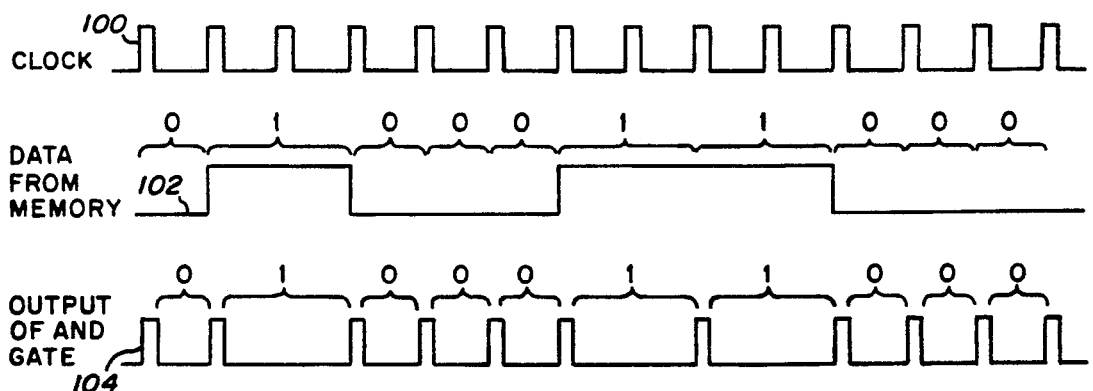
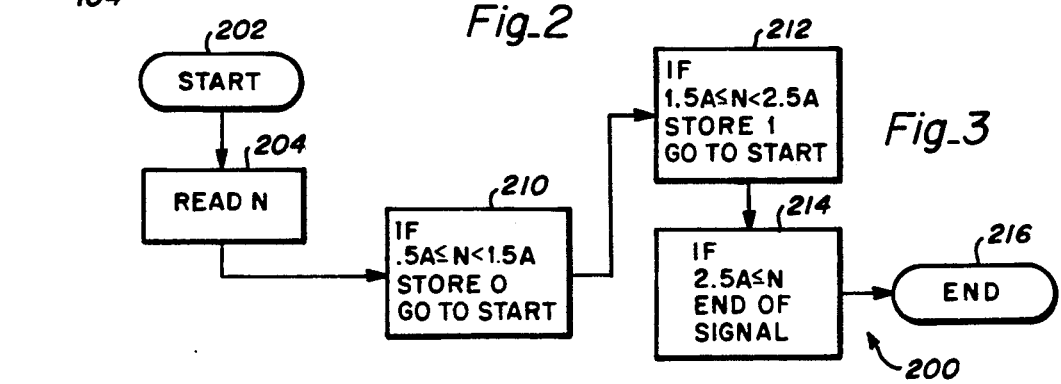
Fig_2
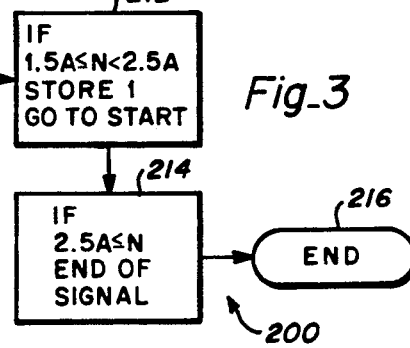
Fig_3

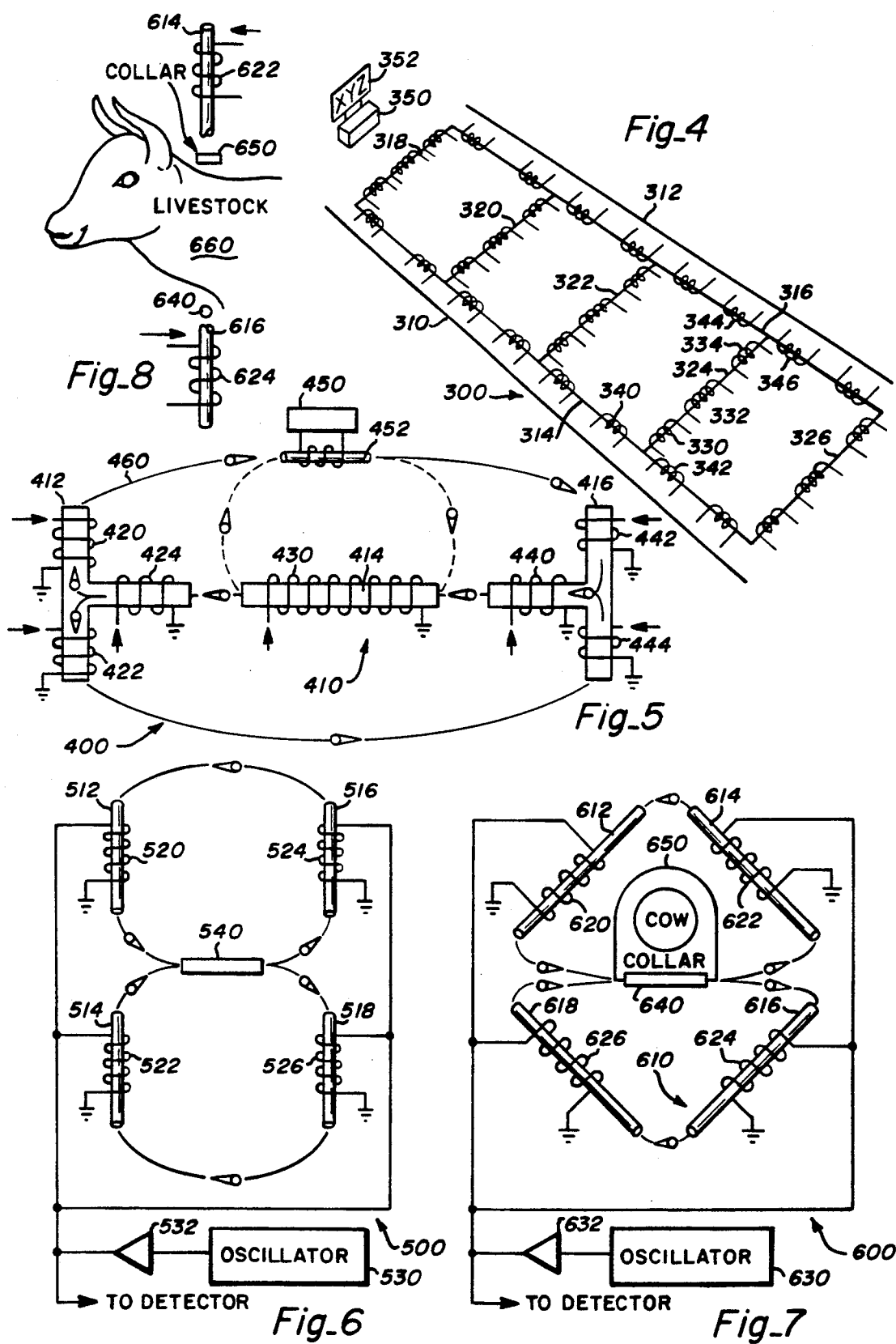

PROXIMITY IDENTIFICATION SYSTEM WITH FLUX CONCENTRATION IN OPERATING REGION

This is a continuation of copending application Ser. No. 07/361,560 filed on Jun. 5, 1989 now abandoned.

BACKGROUND OF THE INVENTION

1. Field of the Invention

This invention relates generally to electronic identification and recognition systems and more specifically to such systems wherein it is not necessary to make physical contact between the identifier section and the reader section.

2. Description of the Prior Art

There are various electronic identification and recognition systems wherein the identifying device is portable. Sometimes the identifying device is referred to as a "card", "tag", "key", "identifier", "response unit", "transponder" or the like. The recognition station, also known as a interrogation unit or reader section, is prepared to recognize identifying devices of predetermined characteristics when such identifying device is brought within the proximity of the reader section.

Uses for such systems may include identification of persons having identifying devices in their possession. For example, the identifying device may take the shape of a credit card and have an electronic circuit embedded therein for radiating signals of identifying intelligence. An individual possessing the card may position it adjacent a door that the individual desires to enter. A recognition device may be arranged to control the door latch and if it recognizes radiated signals of a certain predetermined intelligence, the door latch responds to the reader when the individual places the card proximate to the reader. Other uses for such systems include having the identifier in the form of a tag attached to a vehicle to be identified. As the vehicle passes a certain location, such as a toll booth, its identification is recognized and recorded. Also, in production lines, garments or other items may carry identification tags so that they can be appropriately processed as they are recognized along various points in the production process.

The prior art includes various patents and patent applications by the present inventor The patents include U.S. Pat. No. 3,732,465 for "Electronic Sensing and Actuator System", issued May 8, 1973, U.S. Pat. No. 4,223,830 for "Identification System", issued Sep. 23, 1980; U.S. Pat. No. 4,236,068 for "Personal Identification and Signaling System", issued Nov. 25, 1980; U.S. Pat. No. 4,384,288 for "Portable Radio Frequency Emitting Identifier", issued May 17, 1983; U.S. Pat. No. 4,388,524 for "Electronic Identification and Recognition With Code Changeable Reactance", issued Jun. 14, 1983; U.S. Pat. No. 4,459,474 for "Identification System With Separation and Direction Capability and Improved Noise Reduction", issued Jul. 10, 1984; U.S. Pat. No. 4,473,825 for "Electronic Identification System With Power Input-Output Interlock and Increased Capabilities", issued Sep. 25, 1984; U.S. Pat. No. 4,546,241 for "Electronic Proximity Identification System", issued Oct. 8, 1985; U.S. Pat. No. 4,580,041 for "Electronic Proximity Identification System With Low Power Identifier, Simplified", issued Apr. 1, 1986; U.S. Pat. No. 4,600,829 for "Electronic Proximity Identification and Recognition System With Isolated Two-Way Coupling", issued Jul. 15, 1986; U.S. Pat. No. 4,654,658 for "Identification System With Vector Phase Angle Detection", issued Mar. 31, 1987; U.S. Pat. No. 4,656,472 for "Proximity Identification System With Power Aided Identifier", issued Apr. 7, 1987; and U.S. Pat. No. 4,782,342 for "Proximity Identification System With Lateral Flux Paths", issued Nov. 1, 1988. In addition, there is currently pending U.S. patent application Ser. No. 07/109,738, now abandoned, for "Electronic Proximity Vehicle Identification System With Dual and Single Frequencies", filed Oct. 19, 1987 and U.S. patent application Ser. No. 07/203,944, now U.S. Pat. No. 4,888,474 for "Proximity Identification System With Lateral Flux Magnetic Rod Coupling", filed Jun. 8, 1988.

The proximity identification systems of the prior art, which use inductive coupling, tend to have a limited range. The reader and identifier sections must be relatively close together for reliable data transmission between the two. There is a need for a proximity identification system with greater range and reliability of data transmission.

SUMMARY OF THE PRESENT INVENTION

It is therefore an object of the present invention to provide a proximity identification system with increased range and reliability of data transmission.

Briefly, in a preferred embodiment, the present invention comprises a reader section having a reader circuit connected to a reader antenna. The reader circuit supplies a power signal to the reader antenna and detects an identifier signal. The reader antenna is made of a ferrite material and is arranged in the shape of an "I" or an "H".

An identifier section comprises an identifier circuit connected to an identifier antenna. The identifier circuit generates an identifier signal responsive to said power signal. The identifier signal is generated by converting a digital signal into a series of pulses. Each of these pulses has a time duration less than that of a clock cycle (25% of a clock cycle in a preferred embodiment). Short pulses have the advantage of less interference with transmission of power to the identifier circuits. Digital data is represented by the time duration between each of said pulses. The combination of the short pulses in the identifier signal and the unique configuration of the reader antenna give the present invention improved range and data transmission reliability.

It is therefore an advantage of the present invention in that it provides a proximity identification system with increased range and reliability of data transmission.

These and other objects and advantages of the present invention will no doubt become obvious to those of ordinary skill in the art after having read the following detailed description of the preferred embodiments which are illustrates in the various drawing figures.

IN THE DRAWINGS

FIG. 1 is a circuit diagram of a preferred embodiment of the present invention;

FIG. 2 is a timing diagram of the signals of FIG. 1;

FIG. 3 is a flow chart of the process steps used in FIG. 1;

FIG. 4 is a diagram of a first alternative embodiment of the reader antenna of the present invention showing extended speed identification using multiple antennas in the direction of travel;

FIG. 5 is a diagram of a second alternative embodiment of the reader antenna of the present invention showing enhancement of the inductive field by using ferrite "T" sections;

FIG. 6 is a diagram of a third alternative embodiment of the reader antenna of the present invention;

FIG. 7 is a diagram of a fourth alternative embodiment of the reader antenna of the present invention; and FIG. 8 is a diagram of a side view of the reader antenna of FIG. 7.

DETAILED DESCRIPTION OF THE PREFERRED EMBODIMENT

FIG. 1 is a circuit diagram of a proximity identification system of the present invention and is referred to by the general reference number 10. The system 10 includes a reader section 12 and an identifier section 14. The reader 12 has an oscillator 16 which in the preferred embodiment has a frequency between 100 kilohertz and 20 megahertz. An amplifier 18 is connected to oscillator 16. Amplifier 18 has two outputs which are 180° out of phase with one another.

A reader antenna 20 is made of a ferrite material which is in the shape of an "I" or "H". Antenna 20 has a middle section 22 and a pair of end sections 24 and 26. Sections 22, 24 and 26 all lie within the same horizontal plane. One of the outputs of amplifier 18 is connected to a winding 30 and the other output of amplifier 18 is connected to a winding 32. Windings 30 and 32 are wound in opposite directions around middle section 22. The windings 30 and 32 are excited by amplifier 18 alternately and cooperatively to produce a maximum AC flux which is illustrated by flux lines 40 and 42. This is a push-pull arrangement.

End section 24 has a winding 46 at one end and a winding 48 at another end. Windings 46 and 48 are wound in opposite directions. End section 26 has a winding 50 at one end and a winding 52 at the other end. Windings 50 and 52 are wound in opposite directions. Windings 46, 48, 50 and 52 are all excited in phase with winding 30. These additional windings on the end sections 24 and 26 help to increase the flow of flux lines through antenna 20 and hence, provide a larger and more evenly distributed inductive field.

Middle section 22 also contains a winding 60 which is connected to a detector 62. Detector 62 is connected to an amplifier 64 which in turn is connected to a multiplie AND gate 65. A counter 66 is also connected to the input of AND gate 65. Counter 66 is reset by an inverter 67 connected between it and detector 62. An oscillator 68 is connected to counter 66. A computer 70 is connected to the output of And gate 65.

Identifier section 14 is comprised of an identifier antenna 80, made of a ferrite rod 82 having a winding 84. A diode 86 is connected to antenna 80. A capacitor 88 is connected between diode 86 and a floating ground. A clock 90 is connected to diode 86. The output of clock 90 is connected to the clock input of a J-K flip-flop 92. The output of clock 90 is connected to a double inverter 93. The outputs of not Q of flip-flop 92 and double inverter 93 are connected to an AND gate 94. A double inverter 95 is connected to the output of AND gate 94. Inverters 93 and 95 act as time delays. A memory 96 is connected to the output of double inverter 95. The output of memory 96 is connected to the J input of flip-flop 92. A transistor 98 is connected between double inverter 95 and antenna 80.

The operation of system 10 is as follows. Assuming system 10 is used for vehicle identification, reader antenna 20 may be located in a roadbed. Identifier section 14 may be attached to a vehicle such that antenna 80 is oriented parallel to middle section 22 of antenna 20.

Oscillator 16 and amplifier 18 excite antenna 20 such that an inductive field or power signal is set up across the roadbed. Identifier antenna 80 receives the power signal as it enters the area around the inductive field. Diode 86 and capacitor 88 act as a filter to provide DC power to clock 90. The clock signals from clock 90 pass through AND gate 94 and cycle memory 96. Memory 96 outputs a digital signal which represents the unique code of the identifier. The digital signal is input to flip-flop 92 and the not Q of output of flip-flop 92 gates the clock signals from clock 90 at gate 94.

The result is that the digital output of memory 96 is converted to a set of pulses. The width of the pulses is that of the width of the clock output pulse. This width is held to less than 25% of the clock output cycle, (i.e., spacing between clocks), typically to one-eighth of the clock cycle. The reason for keeping the pulses narrow is that the pulse inhibits the identifier coil resonance, and during this brief inhibition interval power is not received by the identifier. For maximum power coupling, therefore, pulses are kept as narrow as possible consistent with practical restraints of bandwidth and practical circuit response times.

The spacing between the pulses conveys the intelligence, with a "1" represented by a separation of two clock cycles, and a "0" by a separation of one clock cycle. This sequence is depicted in FIG. 2. FIG. 2 is discussed again later.

This series of pulses controls transistor 98 which when On inhibits the resonance of antenna 80 and inhibits the current flow, so that the field around antenna 80, which is composed of and illustrated by flux lines 40 and 42, is affected. Via these flux lines the field around reader antenna assembly 20 is affected. The effect shows itself as small amplitude and phase variations in the voltage induced in coil winding 60.

Winding 60 is connected to detector 62. Detector 62 may be either of the amplitude detect or phase detect variety. Both have been modeled, and work equally well according to both theory and practice. Therefore, the more simple amplitude detector has been used. The output of the detector is a small size repetition of the modulation which occurred in the identifier. The small value is amplified to logic levels by amplifier 64. This logic level controls multiple AND gate 65.

Oscillator 68 runs at a speed 10 to 1000 times that of the clock 90 within the identifier 14. Its count is accumulated on counter 66.

Counter 66 can contain any value from zero to its maximum. Multiple AND gate 65 half connects each bit or counter position of counter 66 to the computer 70 parallel interface input. When a pulse is emitted from amplifier 64, AND gates 65 are fully selected, and the value from counter 66 is transferred to the computer 70.

FIG. 2 is a timing diagram of the system 10 of FIG. 1. A line 100 shows the timing pulses of the output of clock 90 at a point 101 of FIG. 1. A line 102 shows the output of memory 96 at a point 103 of FIG. 1. A line 104 shows the output of AND gate 94 at a point 105 of FIG. 1. Line 104 shows that the memory data signals of line 102 have been converted to a series of pulses. Each pulse has a time duration or width equal to a clock pulse. Ones are represented by a time duration between pulses equal to the space of two clock cycles and zeros are represented by a time duration between pulses equal the space of a single clock cycle.

FIG. 3 shows a flow chart of the method used by computer 70 to determine the identifier code of identifier 14 and is designated by the general reference number 200. At a step 202 the method starts. At a step 204, the counter value (N) from counter 66 is read. "A" is a constant which is equal to the ratio of the frequency of oscillator 68 to that of clock 90. In the preferred embodiment oscillator 68 is 1000 times the frequency of clock 90 so "A" is set to 1000. At a step 210 it is determined if N is equal or greater than 0.5A and less than 1.5A. If it is, then a zero is stored and the computer goes to step 202. If N is not equal or greater than 0.5A and less than 1.5A, then the computer goes to a step 212.

At step 212 it is determined if N is equal or greater than 1.5A and less than 2.5A and if it is, then a one is stored and the computer returns to step 202. If N is not equal or greater than 1.5A and less than 2.5A, then the computer goes to a step 214. At step 214, it is determined if N is greater or equal to 2.5A and if it is, then the end of the signal has been reached and the process stops at a step 216. The result of method 200 is that computer 70 is able to use the counter values from counter 66 to convert the series of pulses as shown on line 104 in FIG. 2 back into a digital signal representing the contents of memory 96. The computer 70 can then use the digital signal to uniquely identify the identifier section 14.

FIG. 4 shows a diagram of an alternative large scale embodiment of the present invention and is designated by the general reference number 300. A reader antenna 310 is mounted in a roadbed 312. The antenna 310 is comprised of a pair of long ferrite rods 314 and 316. A plurality of ferrite rod cross pieces 318, 320, 322, 324 and 326 are positioned between and perpendicular to rods 314 and 316. The cross piece rods 318-326 correspond to middle section 22 and the rods 314 and 316 correspond to the end sections 24 and 26 of reader antenna 20 of FIG. 1. The wiring for the various windings of antenna 310 is similar to that of antenna 20. For example, a plurality of windings 330, 332 and 334 of antenna 310 would correspond to windings 30, 60 and 32 of antenna 20. Similarly, a plurality of windings 340, 342, 344 and 346 of antenna 310 would correspond to windings 46, 48, 50 and 52 of antenna 20. Windings 340, 342, 344, 346 and similar windings on rods 314 and 316 are located close to cross pieces such as 324. The windings of antenna 310 are connected to reader section circuitry similar to that of section 12 of FIG. 1. Flux lines flow from rod 314 to rod 316.

An identifier section 350 similar to that of identifier section 14 of system 10 is attached to a license plate 352 of a vehicle. As the vehicle moves along roadbed 312 it passes through the inductive field created by antenna 310. Antenna 310 creates a long inductive field and gives the reader section a longer period in which to read the moving identifier section 350.

FIG. 5 shows a diagram of an alternative embodiment of the present invention and is designated by the general reference number 400. A reader antenna 410 is comprised of a "T" section 412, a middle section 414 and a "T" section 416. Sections 412, 414 and 416 are all made of a ferrite material. There is a gap between the "T" sections 412 and 416 and the middle section 414. Antenna 410 is wired to reader section circuitry similar to that of section 12 of FIG. 1. "T" section 412 has a plurality of windings 420, 422 and 424 which correspond to windings 46, 48 and 30, respectively, of FIG. 1. Middle section 414 has a winding 430 which corresponds to winding 60 of FIG. 1. "T" section 416 has a plurality of windings 440, 442 and 444 which correspond to windings 32, 50 and 52, respectively, of FIG. 1.

An identifier section 450 is similar to identifier section 14 of FIG. 1 and has an identifier antenna 452. A plurality of flux lines 460 are received by the identifier antenna 452.

An advantage of antenna 410 is that it may be used in a roadbed which has heavy load vehicle traffic. Having antenna 410 in sections allows it to deflect in response to the heavy vehicle traffic passing above it. The flux is able to travel easily across the gap between section 412, 414 and 416.

FIG. 6 shows a diagram of an alternative embodiment of the present invention and is designated by the general reference number 500. A reader antenna 510 is comprised of four ferrite rods 512, 514, 516 and 518 with windings 520, 522, 524 and 526, respectively. The rods 512-518 are arranged vertically in two parallel lines of two. An oscillator 530 is connected to an amplifier 532 which in turn is connected to windings 520, 522, 524 and 526. The windings 520-526 are also connected to a detector (not shown) and related circuitry similar to that of the circuitry of reader section 12 of FIG. 1.

In operation, an identifier section 540 similar to that of identifier section 14 of FIG. 1 passes between the vertical rods 512-518. The identifier section 540 is then read.

The advantage of this configuration is that a strong lateral flux field is created in line with identifier section 540. A license plate bearing identifier 540 may be read while passing between roadside mounted reader antennas, rather than reader antennas mounted in the roadbed. End sections such as 20 and 26 of FIG. 1 may be added to rods 512, 514, 516 and 518 to further enhance the flux flow.

FIG. 7 shows a diagram of an alternative embodiment of the present invention and is designated by the general reference number 600. A reader antenna 610 is comprised of a plurality of polarized ferrite rods 612, 614, 616 and 618 having windings 620, 622, 624 and 626, respectively. Rods 612-618 are arranged in a vertical plane in a diamond pattern. An oscillator 630 is connected to an amplifier 632 which in turn is connected to windings 620-626. Windings 620-626 are also connected to a detector (not shown) and related circuitry similar to that of reader section 12 of FIG. 1. As shown by the flux lines in FIG. 7, the flux is concentrated at the diagonal.

In operation, an identifier section 640, similar to section 14 of FIG. 1 is attached to a collar 650. Collar 650 may be placed around the neck of livestock 660. When the animal 660 places its head through the diamond arrangement of antenna 610, then the unique identifier code may be read and the particular animal identified. When it its within the diagonal flux lines as shown in FIG. 7. FIG. 8 shows a side view of FIG. 7.

The advantages of the present invention may now be understood. Power for the identifier section is received from a power signal transmitted by the reader section. This limited amount of power is needed by the identifier section to cycle its memory and transmit the identifier signal. Previous designs have used the digital signal directly from the memory for modulating the identifier signal. A problem with this is that the relatively long pulses of the digital signals inhibit the reception of power from the reader section, and this results in a short range reading. The essential point is that the power supply of the identifier is enhanced. Therefore, the short modulation pulses are important the good performance of the present invention.

The present invention uses a unique method to modulate an identifier signal using short pulses which are equal or less in duration to clock pulses. These short pulses are much less of an inhibition on the charging of the identifier power supply and result in a stronger identifier signal. This results in increased range and data transmission reliability of the whole system.

A further increase in range and reliability results from the unique arrangement of the reader antenna of the present invention. Previous proximity identification systems, such as those by the same inventor, used a reader antenna which was a single ferrite rod. The resulting inductive field had an oval shape and was pinched at the ends of the ferrite rod. The flux lines tended to exit the side of the ferrite rod before reaching the very end of the rod. The result was a constricted flux field. The present invention solves this problem by using end pieces. The flux lines now exit the antenna at these end pieces. The end pieces act to spread the flux lines out over a wider area. This results in a larger and more even concentration of flux lines. The overall result is that the range and data transmission reliability of the entire system is greatly improved.

A further improvement is obtained, in the devices of FIGS. 6 and 7, by using multiple ferrite rods in the reader section to concentrate the lateral flux field in the region of greatest interest. Another improvement is obtained in device of FIG. 4 by repeating the flux pattern in the direction of travel, thereby allowing identification of vehicle at higher and higher speeds.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:
1. A proximity identification system comprising:
a reader antenna comprising at least one coil wound around each of a group of four ferrite rods in a diamond-shaped pattern and polarized and placed so as to generate strong diagonal and lateral flux lines within said diamond-shaped pattern;
a reader section having a reader circuit means connected to the reader antenna for simultaneously supplying a power signal to the reader antenna and detecting an identifier signal, said reader circuit means comprising: (a) an oscillator connected to a power amplifier connected to the reader antenna for generating said power signal, (b) a detector means connected to the reader antenna for detecting said identifier signal, and (c) an amplifier to convert said detected signals to pulses; and
an identifier tag section having an identifier antenna formed of a ferrite rod with a winding, and an identifier circuit means connected to the winding for generating an identifier signal for modulating the impedance of the tag winding with the modulation changing the flux field around the tag antenna and the changing flux field also changing the flux in the reader antenna when said identifier antenna is disposed within said diagonal flux lines generated by the reader antenna.

2. A proximity identification system comprising:
an identifier tag having means to emit an identifying signal in response to an excitation energy and including a ferrite rod antenna with a winding;
a reader antenna connected to radiate excitation energy to the tag and shaped to concentrate a flux field in manner favorable to excitation of the tag;
a reader electronic section having means to power the reader antenna, means to detect and amplify emissions from the identifier tag, and means to report the emissions to a computer;
the reader antenna being formed in a diamond arrangement of four ferrite rods having windings that are wound on said rods for polarizing said rods in a manner that creates the greatest intensity of said external flux about a diagonal line in the center of said diamond arrangement, and
the identifier tag is situated at the center of said diamond arrangement and said rod antenna is aligned with said diagonal line, so that said identifying signal from the identifier has maximum favorable excitation of the tag.

* * * * *